(12) United States Patent
Holmes et al.

(10) Patent No.: US 7,610,976 B2
(45) Date of Patent: Nov. 3, 2009

(54) HYBRID POWERTRAIN WITH ELECTRICALLY VARIABLE TRANSMISSION HAVING PARALLEL FRICTION LAUNCH AND METHOD

(75) Inventors: Alan G. Holmes, Clarkston, MI (US); Michael R. Schmidt, Carmel, IN (US); Donald Klemen, Carmel, IN (US); Larry T. Nitz, South Lyon, MI (US); Grantland I. Kingman, Waterford, MI (US); Anthony H. Heap, Ann Arbor, MI (US); Gregory A. Hubbard, Brighton, MI (US); Brendan M. Conlon, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 511 days.

(21) Appl. No.: 11/416,912

(22) Filed: May 3, 2006

(65) Prior Publication Data

US 2007/0256870 A1 Nov. 8, 2007

(51) Int. Cl.
*B60W 20/00* (2006.01)
(52) U.S. Cl. .............. 180/65.29; 180/65.265; 180/65.285; 477/5; 477/8
(58) Field of Classification Search ............ 180/65.25, 180/65.265, 65.285, 65.29; 477/5, 8
See application file for complete search history.

(56) References Cited

U.S. PATENT DOCUMENTS

| | | | | |
|---|---|---|---|---|
| 5,009,301 | A | 4/1991 | Spitler | 192/106.2 |
| 6,208,097 | B1 * | 3/2001 | Reddy et al. | 318/52 |
| 6,471,616 | B2 | 10/2002 | Stevenson | 475/296 |
| 6,473,683 | B1 * | 10/2002 | Nada | 701/82 |
| 6,732,526 | B2 * | 5/2004 | Minagawa et al. | 60/706 |
| 6,857,985 | B2 * | 2/2005 | Williams | 477/5 |
| 6,953,409 | B2 * | 10/2005 | Schmidt et al. | 475/5 |
| 7,169,073 | B2 * | 1/2007 | Schmidt et al. | 475/5 |
| 7,169,074 | B2 * | 1/2007 | Raghavan et al. | 475/5 |
| 7,217,211 | B2 * | 5/2007 | Klemen et al. | 475/5 |
| 7,261,661 | B2 * | 8/2007 | Schmidt | 475/5 |
| 7,305,873 | B2 * | 12/2007 | Hubbard et al. | 73/114.11 |
| 7,356,398 | B2 * | 4/2008 | Steinmetz et al. | 701/55 |
| 7,395,889 | B2 * | 7/2008 | Sugiyama et al. | 180/65.285 |
| 7,407,026 | B2 * | 8/2008 | Tamor | 180/65.28 |
| 7,434,641 | B2 * | 10/2008 | Takami et al. | 180/65.25 |
| 7,481,737 | B2 * | 1/2009 | Tabata et al. | 477/3 |
| 7,491,144 | B2 * | 2/2009 | Conlon | 475/5 |
| 7,494,435 | B2 * | 2/2009 | Bucknor et al. | 475/5 |
| 7,500,534 | B2 * | 3/2009 | Hommi | 180/197 |
| 2001/0032046 | A1 * | 10/2001 | Nada | 701/82 |
| 2004/0005954 | A1 * | 1/2004 | Asa et al. | 477/7 |
| 2004/0009842 | A1 * | 1/2004 | Inada | 477/5 |
| 2005/0060079 | A1 * | 3/2005 | Phillips et al. | 701/53 |
| 2006/0194670 | A1 * | 8/2006 | Heap et al. | 477/3 |
| 2007/0114082 | A1 * | 5/2007 | Nozaki et al. | 180/65.6 |
| 2007/0256870 | A1 * | 11/2007 | Holmes et al. | 180/65.2 |
| 2008/0064550 | A1 * | 3/2008 | Holmes | 475/5 |
| 2008/0234097 | A1 * | 9/2008 | Sah | 477/3 |

(Continued)

*Primary Examiner*—Jeffrey J Restifo

(57) ABSTRACT

A hybrid powertrain includes a control unit that regulates electric power interchange an energy storage device and a motor/generator for causing selective torque generation by the motor/generator and for controlling engagement of torque-transmitting mechanisms. The control unit is configured to place the torque-transmitting mechanism in slipping engagement to launch the vehicle and thereby decouple a fixed relationship between engine torque and motor/generator torque or between engine torque and torque at the output member. A method of operating a hybrid vehicle powertrain is also provided.

7 Claims, 3 Drawing Sheets

U.S. PATENT DOCUMENTS

2008/0280726 A1* 11/2008 Holmes et al. .................. 477/5
2008/0288145 A1* 11/2008 Maeda et al. .................. 701/53
2008/0305924 A1* 12/2008 Soliman et al. ................. 477/5
2008/0305925 A1* 12/2008 Soliman et al. ................. 477/5

* cited by examiner

FIG. 2

| Mode | Clutch/Motor |
|---|---|
| PARALLEL FRICTION LAUNCH/SLIP C1 | C1,C4,C5,MA,MB (70,71,75) |
| PARALLEL FRICTION LAUNCH/SLIP C4 | C1,C4,C5,MA,MB (70,71,75) |
| PARALLEL FRICTION LAUNCH/SLIP C5 | C1,C4,C5,MA,MB (70,71,75) |
| LAUNCH/MODE 1 | C1 C5 GA MB (70,71) |
| 1st ~ 3.7 | C1 C5 C4 (70,71,75) |
| 2nd ~ 1.7 | C1 C5 C2 (70,71,62) |
| MODE 2 | C2 C5 MA MB (62,71) |
| 3rd ~ 1.0 | C2 C5 C4 (62,71,75) |
| 4th ~ .74 | C2 C3 C5 (62,71,73) |

HYBRID POWERTRAIN WITH ELECTRICALLY VARIABLE TRANSMISSION HAVING PARALLEL FRICTION LAUNCH AND METHOD

TECHNICAL FIELD

The invention relates to a hybrid powertrain and to a method of operating the same.

BACKGROUND OF THE INVENTION

Hybrid electrically variable powertrains include an engine, and a transmission that receives power flow from the engine and from one or more motor/generators. Hybrid electrically variable transmissions have a differential gear set, with power from the engine and power from the motor/generator flowing through different members of the differential gear set. Hybrid electrically variable transmissions may include torque-transmitting mechanisms controllable in various engagement schemes to offer a combination of operating modes, including both electrically variable ranges and fixed gear ratios. The electrically variable ranges typically provide smooth operation while the fixed gear ratios provide maximum torque performance and maximum fuel economy under certain conditions such as continuous highway cruising. Fixed gear ratios typically provide excellent transmission output torque and vehicle acceleration by coupling the motor/generators and the engine directly together. However, operation in the first fixed gear ratio typically has a lower limit corresponding with engine idle speed and a low output torque corresponding with the low engine speed. By contrast, launching in an electrically variable mode usually requires that one motor/generator provide the engine reaction torque, and it is thus not able to contribute to the maximum torque towards output torque in comparison to a direct coupling between that motor and the output.

SUMMARY OF THE INVENTION

An electrically variable powertrain is provided with a transmission capable of launching a vehicle in a parallel friction launch mode in which a torque-transmitting mechanism is operated in a controlled slip to allow an advantageous combination of engine torque and motor/generator torque at the output member. A ratio of engine torque to motor/generator torque otherwise required and determined by the differential gearing in the transmission is not limiting. Within the scope of the invention, the hybrid powertrain includes a control unit that regulates electrical power interchange between an energy storage device, such as a battery, and a motor/generator to cause selective torque generation by the motor/generator. The control unit also controls engagement of the torque-transmitting mechanisms in the transmission and is configured to engage torque-transmitting mechanisms necessary to establish a fixed speed ratio, with one or more of the torque-transmitting mechanisms in slipping engagement. The torque-transmitting mechanism placed in slipping engagement may be one that connects any two members of a differential gear set to one another, one that connects the transmission input member with one of the members of the differential gear set, or one that connects the differential gear set to the output member (either directly or by grounding one of the members of the differential gear set).

In hybrid electrically variable transmissions having first and second motor/generators, if the slipping torque-transmitting mechanism places one of the motor/generators in slipping relationship with the output member and the other of the motor/generators in non-slipping relationship with the output member, the control unit causes electric power flow to the motor/generator in the non-slipping relationship with the output member until the motor/generator reaches its maximum torque capacity if the electric power storage device is operating within its predetermined maximum power limit. At that point, the control unit is configured to cause electric power flow to the motor/generator in slipping relationship with the output member. Thus, torque flow is managed to allow maximum torque at the output member in a manner that is not fixed or determined by the differential gearing within the transmission.

Thus, a method of operating a hybrid vehicle powertrain includes slipping at least one torque-transmitting mechanism via a control unit operable to control engagement of the torque-transmitting mechanism while any other torque-transmitting mechanisms necessary to establish a fixed speed ratio between the input member and output member of the transmission are engaged either slippingly or non-slippingly. The slipping decouples a fixed relationship between engine torque and motor/generator torque or between engine torque and torque at the output member established by the differential gear set. The method further includes controlling the speed of the engine and the speed of the motor/generators via the control unit to launch the vehicle. If two motor/generators are present in the hybrid powertrain, the controlling step of the method includes causing electric power flow to the motor/generator in non-slipping relationship with the output member until that motor/generator reaches its maximum torque capacity if the electric power storage device is operating within its predetermined maximum power limit. At that point, the control unit also causes electric power flow to the motor/generator in slipping relationship with the output member. Slipping of multiple torque-transmitting mechanisms also distributes among the torque-transmitting mechanisms heat generated during launch, and the control scheme may be determined based upon this distribution.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a truth table for operating the transmission represented by FIG. 1 according to the concepts of the present invention.

DESCRIPTION OF THE PREFERRED EMBODIMENTS

Figure 1:
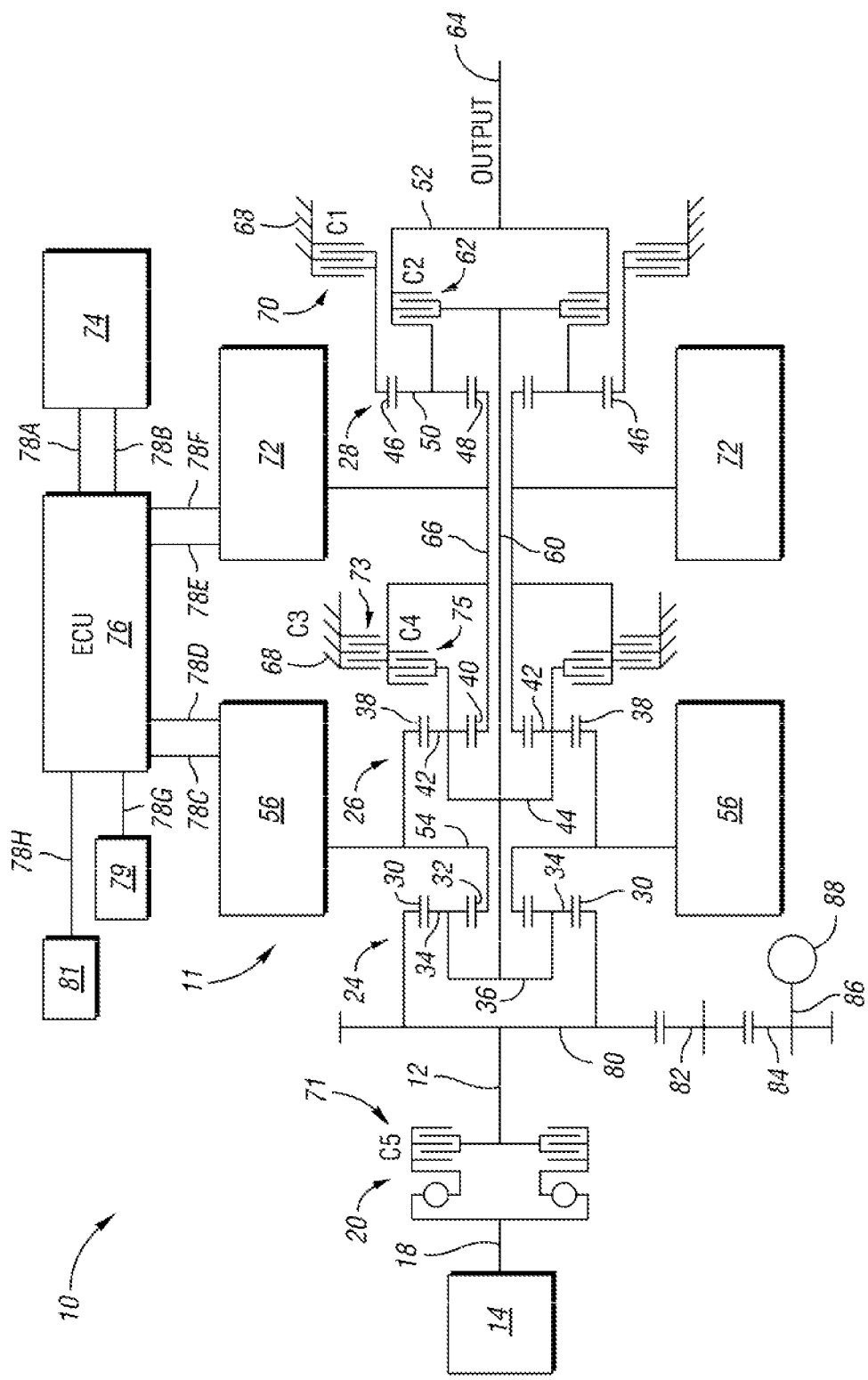
FIG. 1 is a schematic representation of a two-mode, compound-split, electro-mechanical transmission.

One representative form of a powertrain 10 embodying the concepts of the present invention is depicted in FIG. 1, and is designated generally by the numeral 10. The powertrain 10 includes a two-mode, compound-split, electro-mechanical transmission 11. The hybrid transmission 11 has an input member 12 that may be in the nature of a shaft which may be directly driven by an engine 14 which is also part of the powertrain 10. A transient torque damper may be incorporated between the output shaft 18 of the engine 14 and the input member 12 of the hybrid transmission 11. An example of a transient torque damper of the type recommended for the present usage is disclosed in detail in U.S. Pat. No. 5,009,301, which issued on Apr. 23, 1991 to Spitler, is commonly assigned to General Motors Corporation, and which is hereby incorporated by reference in its entirety.

In the embodiment depicted, the engine 14 may be a fossil fuel engine, such as a diesel engine which is readily adapted to provide its available power output delivered at a constant number of revolutions per minute (RPM). In the exemplary embodiment, the engine 14 can—after start-up, and during the majority of its input—operate at a constant speed of approximately 6000 RPM. Irrespective of the means by which the engine 14 is connected to the input member 12 of the transmission 11, the input member 12 is operatively connectable to a planetary gear set 24 in the transmission 11.

The hybrid transmission 11 utilizes three planetary gear sets 24, 26 and 28. The first planetary gear set 24 has an outer gear member 30 that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear set 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear set 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

In this embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34. It should be appreciated that other tooth ratios may be employed to obtain different transmission speed ratios, as desired.

While all three planetary gear sets 24, 26 and 28 are "simple" planetary gear sets in their own right, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque-transmitting mechanism 62 which, as will be hereinafter more fully explained, is employed to assist in the selection of the operational modes of the hybrid transmission 11.

The carrier 52 of the third planetary gear set 28 is connected directly to the transmission output member 64. When the hybrid transmission 11 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque-transmitting mechanism 70. Torque-transmitting mechanism 70, as is also hereinafter explained, is also employed to assist in the selection of the operational modes of the hybrid transmission 11. Torque-transmitting mechanism 71 is selectively engagable to transfer engine torque from the input member 12 to the first planetary gear set 24; specifically, from the input member 12 to the ring gear member 30. The sleeve shaft 66 is also continuously connected to a second motor/generator 72. All the planetary gear sets 24, 26 and 28 as well as the two motor/generators 56 and 72 are coaxially oriented, as about the axially disposed shaft 60. It should be noted that both motor/generators 56 and 72 are of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope—i.e.: the circumferential dimension—of the transmission 11 is minimized.

A torque-transmitting mechanism 73 selectively connects the sun gears 40 and 48 with ground (i.e.: with transmission housing 68). A torque-transmitting mechanism 75 is operative as a lock-up clutch, locking planetary gear sets 24, 26, motors 56, 72 and the input to rotate as a group, by selectively connecting the sun gear 40 with the carrier 44. The torque-transmitting mechanisms 62, 70, 71, 73, 75 are all friction clutches.

It should be noted that two members of differential gear sets 26 and 28 are operatively connectable to the output member 64 for rotation at two different speeds, each of the speeds being proportional to the speed of said output member 64. Specifically, engagement of clutch 70 operatively connects the sun gear members 40 and 48 to the output member 64. The speed of the sun gear members 40 and 48 is proportional to the speed of the output member as a function of the ratio of the number of teeth of the ring gear member 46 and the sun gear member 48 of the gear set 28. Engagement of clutch 62 connects shaft 60 with the output member 64, causing carrier members 36 and 44 to rotate at the same speed as the output member 64.

As was previously herein explained in conjunction with the description of the engine 14, it must similarly be understood that the rotational speed and horsepower output of the first and second motor/generators 56 and 72 are also not critical to the invention, but for the purpose of effecting an absolutely clear understanding of the hybrid transmission 11, the motors/generators 56 and 72 have a power rating of 90 horsepower and a maximum speed of about 10200 RPM. The power rating is approximately ⅓ that of the engine 14, and the maximum speed is approximately 1.5 times that of the engine 14, although, these depend on the type of engine, final gear schematic and duty cycle.

As should be apparent from the foregoing description, and with particular reference to FIG. 1, the transmission 11 selectively receives power from the engine 14. As will now be explained, the hybrid transmission also receives power from an electric storage device 74. The electric storage device 74 may be one or more batteries and may be referred to herein as a battery. Other electric storage devices that have the ability to store electric power and dispense electric power may be used in place of the batteries without altering the concepts of the present invention. As was explained in conjunction with the description of the engine 14 and the motor/generators 56 and 72, it must similarly be understood that the horsepower output of the electrical storage device 74 is also not critical to the invention, but for the purpose of effecting an absolutely clear understanding of the hybrid transmission 11 an output of about 75 horsepower from the electrical storage device 74 will be assumed for description of an exemplary device. The battery pack is sized depending on regenerative requirements, regional issues such as grade and temperature, and propulsion requirements such as emissions, power assist and electric range.

The electric storage device 74 communicates with an electrical control unit (ECU) 76 by transfer conductors 78A and 78B. The ECU 76 communicates with the first motor/generator 56 by transfer conductors 78C and 78D, and the ECU 76 similarly communicates with the second motor/generator 72 by transfer conductors 78E and 78F. Additionally, the ECU 76 communicates with a valve body 79 via transfer conductor 78G to control selective engagement or disengagement of torque transmitting devices 62, 70, 71, 73 and 75 via hydraulic fluid pressure, as is understood by those skilled in the art. Finally, sensors, designated generally as 81, may be operatively connected with the torque transmitting devices 62, 70, 71, 73 and 75 to provide, via transfer conductors, designated generally as 78H, sensed characteristics to the ECU 76, such as temperature, torque load and relative speed of clutch plates.

As is apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least eight transfer conductors which are generally identified by the numeral 78, but the specific, individual transfer conductors are, therefore, identified as 78A, 78B, 78C, 78D, 78E, 78F, 78G and 78H in the specification and on the drawings. This same suffix convention shall be employed throughout the specification.

A drive gear 80 fixedly connects the input member 12 to the outer gear member 30 of the first planetary gear set 24 (when clutch 71 is engaged), and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and/or PTO unit, designated either individually or collectively at 88.

Operation of the Exemplary Preferred Embodiment

I. Introduction

The operator of the vehicle has three, well-known, primary devices to control the transmission 11. One of the primary control devices is a well known drive range selector (not shown) that directs the ECU 76 to configure the transmission for either the park, reverse, neutral, or forward drive range. The second and third primary control devices constitute an accelerator pedal (not shown) and a brake pedal (also not shown). The information obtained by the ECU 76 from these three primary control sources will hereinafter be referred to as the "operator demand." The ECU 76 also obtains information from both the first and second motor/generators 56 and 72, respectively, the engine 14 and the electric storage device 74. In response to an operator's action, the ECU 76 determines what is required and then manipulates the selectively operated components of the hybrid transmission 11 appropriately to respond to the operator demand.

For example, in the exemplary embodiment shown in FIG. 1, when the operator has selected a forward drive range and manipulates either the accelerator pedal or the brake pedal, the ECU 76 determines if the vehicle should accelerate or decelerate. The ECU 76 also monitors the state of the power sources, and determines the output of the transmission required to affect the desired rate of acceleration or deceleration. Under the direction of the ECU 76 the transmission is capable of providing a range of output speeds from slow to fast in order to meet the operator demand.

In order to provide a full explanation as to the operation of a transmission embodying the concepts of the present invention, a description of the operational modes employed to achieve the output power and speeds necessary to meet the operator demand under various operating conditions will be provided with respect to the preferred embodiment. As such, the following description describes the full power operational states of the particular transmission identified by the numeral 11.

To reiterate, the transmission 11 is a two-mode, compound-split, electro-mechanical, vehicular transmission. In other words, the output member 64 receives power through two distinct gear trains within the transmission 11. A first mode, or gear train, is selected when clutch 71 is engaged and the clutch 70 is actuated in order to "ground" the outer gear member 46 of the third planetary gear set 28. A second mode, or gear train, is selected when clutch 71 remains engaged, the clutch 70 is released and the torque-transmitting mechanism 62 is simultaneously actuated to connect the shaft 60 to the carrier 52 of the third planetary gear set 28.

Those skilled in the art will appreciate that the ECU 76 serves to provide a range of output speeds from relatively slow to relatively fast within each mode of operation. This combination of two modes with a slow to fast output speed range in each mode allows the transmission 11 to propel a vehicle from a stationary condition to highway speeds while satisfying the other objects of the invention. Additionally, the ECU 76 coordinates operation of the transmission 11 so as to allow synchronized shifts between the modes. As noted, operation of the preferred embodiment will be described as it relates to full power operation inasmuch as that approach will fully describe the general operational concepts.

In the following description, it should be noted that the first and second "modes" of operation refer to circumstances in which the transmission functions are controlled by one clutch, clutches 62 or 70 (assuming clutch 71 is engaged), and by the controlled speed and torque of the motor/generators 56 and 72, all as described in U.S. Pat. No. 6,953,409, which issued on Oct. 11, 2005 to Schmidt et al, is commonly assigned to General Motors Corporation, and is hereby incorporated by reference in its entirety. Also, certain "ranges" of operation are described below in which fixed ratios are achieved by applying an additional clutch. This additional clutch may be clutch 62, 73 or 75.

When the additional clutch is applied, a fixed input to output speed ratio is achieved, as illustrated in the truth table of FIG. 2 (i.e., when two clutching mechanisms are applied).

The rotations of the motor/generators 56, 72, will then be dependent on internal rotation of the mechanism as defined by the clutching and proportional to the input speed. The motor/generators, however, still can function as motors or generators, however, they are completely independent of engine to output power flow, thereby enabling both to be motors, both to function as generators, or any combination thereof. This allows, for instance, during acceleration in the first fixed ratio that the engine power and both units functioning as motors accepting power from the energy storage device 74 to be additive into propelling the vehicle through planetary gear set 28 to output 64.

It also should be noted that the function of the transmission can at any time be switched from operation in fixed ratio to mode control by turning the additional clutch off during a fixed ratio of operation. Determination of operation in fixed ratio or mode control is by algorithms in the ECU 76 controlling the transmission.

It also should be noted that the modes of operation may overlap the ratio of operation, and selection depends again on the driver's input and response of the vehicle to that input. As shown in FIG. 2, a first fixed ratio range falls within mode I operation when C1, C4 and C5 (clutches 70, 71 and 75) are engaged, and a second fixed ratio range falls within mode I when C1, C2 and C5 (clutches 62, 70 and 71) are engaged. As illustrated in FIG. 2, a third fixed ratio range is available during mode II when C2, C4 and C5 (clutches 62, 71 and 75) are engaged, and a fourth fixed ratio range is available during mode II when C2, C3 and C5 (clutches 62, 71 and 73) are engaged.

II. First Mode

Launch

When the ECU 76 has determined that the operator desires to move forwardly from a stationary condition, and to accelerate, three different launch operations are possible. The first is an EVT launch mode, in which clutches are selectively engaged to allow a continuously variable speed ratio. A fixed ratio launch mode provides greater torque for acceleration, but places the speed of the engine 14 in a fixed relationship with the speed of one or both motor/generators 56, 72 and requires that the engine be operated from zero speed with a relatively slow increase to idle speed. A parallel friction launch, which involves slipping at least one of the clutches engaged to achieve the fixed ratio launch, avoids this fixed relationship and allows both the engine 14 and the motor/generators 56, 72 to contribute torque while the engine and motor/generators are operating at efficient speeds independent of one another.

EVT Launch

If an EVT launch is desired, the torque-transmitting mechanism 20 is engaged operatively to connect the engine 14 to the input member 12 of the hybrid transmission 11, and torque-transmitting mechanism 20 remains applied as the vehicle moves forwardly through a speed range hereinafter more fully described. The clutch 71 is engaged operatively to connect the input member 12 to the outer gear member 30 of the first planetary gear set 24. The clutch 62 is not applied, and it remains disengaged. The clutch 70 is engaged. In this situation, the engine 14 applies driving power to the outer gear member 30 of the first planetary gear set 24 so the outer member 30 rotates in unison with the input member 12 (and thus the engine 14). The first motor/generator 56 simultaneously rotates the inner gear member 32 of the first planetary gear set 24 and the outer gear member 38 of the second planetary gear set 26 in the same direction, thus driving the carrier 36 in the same direction—which effects rotation of the inner gear member 40 of the second planetary gear set 24.

The second motor/generator 72 operates as a motor during the first mode, and as such motor/generator 72 drives sleeve shaft 66 in that direction which rotates the inner gear member 48 of the third planetary gear set 28 to rotate the planet gears 50 of the third planetary gear set 28 against the outer gear member 46 of the third planetary gear set 28. The outer gear member 46 is fixed by having been grounded so that the carrier 52 drives the output member 64 in that direction required to effect forward movement of the vehicle.

The rotation of the sleeve shaft 66 effected by rotation of the second motor/generator 72 operating as a motor also rotates the inner gear member 40 of the second planetary gear set 26. Because the clutch 62 remains disengaged, the carriers 36 and 44 of the first and second planetary gear sets 24 and 26, respectively, are freely rotatable—but only in unison inasmuch as the two carriers 36 and 44 are compounded. As a result, the rotation of the outer gear member 30 of the first planetary gear set 24 effected by the engine 14 and the rotation of the inner gear member 40 effected by the second motor/generator 72 force the inner gear member 32 of the first planetary gear set 24 and the conjoined outer gear member 38 of the second planetary gear set 26 to drive the first motor/generator 56 in that direction, and velocity, which causes the first motor/generator 56, at least initially, to serve as a generator. As previously noted, the second motor/generator operates as a motor through the entire first mode—i.e.: from zero to about 70 MPH.

Both fixed ratios and continuously variable ranges are used to improve performance or efficiency. Fixed ratios can be selected, overlapping the operation of the modes, to further improve acceleration by increasing the power reaching the output member 64. Starting in mode I, the first motor/generator 56, operates as a generator until approximately 70 MPH. At about 7 MPH, the lock-up clutch 75 is engaged while the clutches 70 and 71 remain engaged. In this configuration, the transmission 11 is engaged in the first fixed ratio as defined by the planetary gear set 28, as illustrated in the table of FIG. 2. When the clutch 75 is engaged, the first two gear sets 24, 26 and motor/generators 56, 72 rotate at the input speed, and are connected with the sun gear 48, and with the clutch 70 also engaged there is a speed reduction provided by planetary gear set 28 and torque is multiplied. All power is transmitted mechanically through the planetary gear sets. With no torque present in the motors/generators 56, 72, there are no electrical losses, thus providing a higher efficiency operation, however, with full torque applied in motor/generators 56, 72, a significant increase in performance can be realized. With both motors locked together by clutch 75, they also can share equally any regenerative power, thereby resulting in higher braking performance with improved cooling. Only the planetary gear set 28 is active because lock-up clutch 75 locks up the planetary gear sets 24 and 26. Engagement of clutch 75 also protects the motors/generators 56, 72 if the power flow necessary for power split operation is more than the motors/generators would tolerate. Therefore, if the vehicle is towing or hauling up a hill, then the motors/generators are protected.

Fixed Ratio Launch

If greater power is demanded for launch, lock-up clutch 75 is engaged in addition to clutches 70 and 71, establishing a fixed speed ratio. The motors 56, 72 may be turned on with the clutch 75 to achieve maximum available horsepower, and the motors/generators' 56, 72 power may be reduced to reduce operating temperatures. Clutch 75 provides the ability for the engine 14 and both motor/generators 56, 72, to all three simultaneously propel the vehicle for maximum acceleration.

However, the relative speeds of the engine 14 and the motor/generators 56, 72 are in a fixed relationship determined by the planetary gear sets 24, 26 and 28.

Parallel Friction Launch

In both the EVT Mode I/Launch and Fixed Ratio Launch operation described above, the torque provided by the engine 14 and the torque provided by each of the motor/generators 56, 72 are in fixed relationship with one another. That is, the planetary gear sets 24 and 26 establish a fixed torque relationship between engine torque and the torque that may be provided by motor/generator 56, as the speed relationship between the engine 14 and the motor/generator 56 is determined by the gear ratios of gear sets 24 and 26. Additionally, a fixed torque relationship is established between engine torque and the torque that may be provided by motor/generator 72, as the speed relationship between the engine 14 and the motor/generator 72 is determined by the gear ratios of gear sets 26 and 28. Depending on desired launch performance, these fixed torque relationships may not be ideal. For instance, the engine 14 achieves greater torque at greater speeds. The motor/generators each 56 and 72 each have a maximum torque capacity at some given speed, but operating the motor/generators at those speeds may not allow the engine 14 to be operated at the speed required to contribute maximum torque. Additionally, the torque output of the motor/generators 56, 72 is dependent on the available battery power in battery 74. A speed relationship that utilizes the engine 14 and the motor/generators 56, 72 at speeds producing maximum torque output from each may not be attainable under the fixed torque (and thus speed) relationship between the engine 14 and the motor/generators 56, 72 established by the differential gearing of gear sets 24, 26 and 28.

Figure 3:
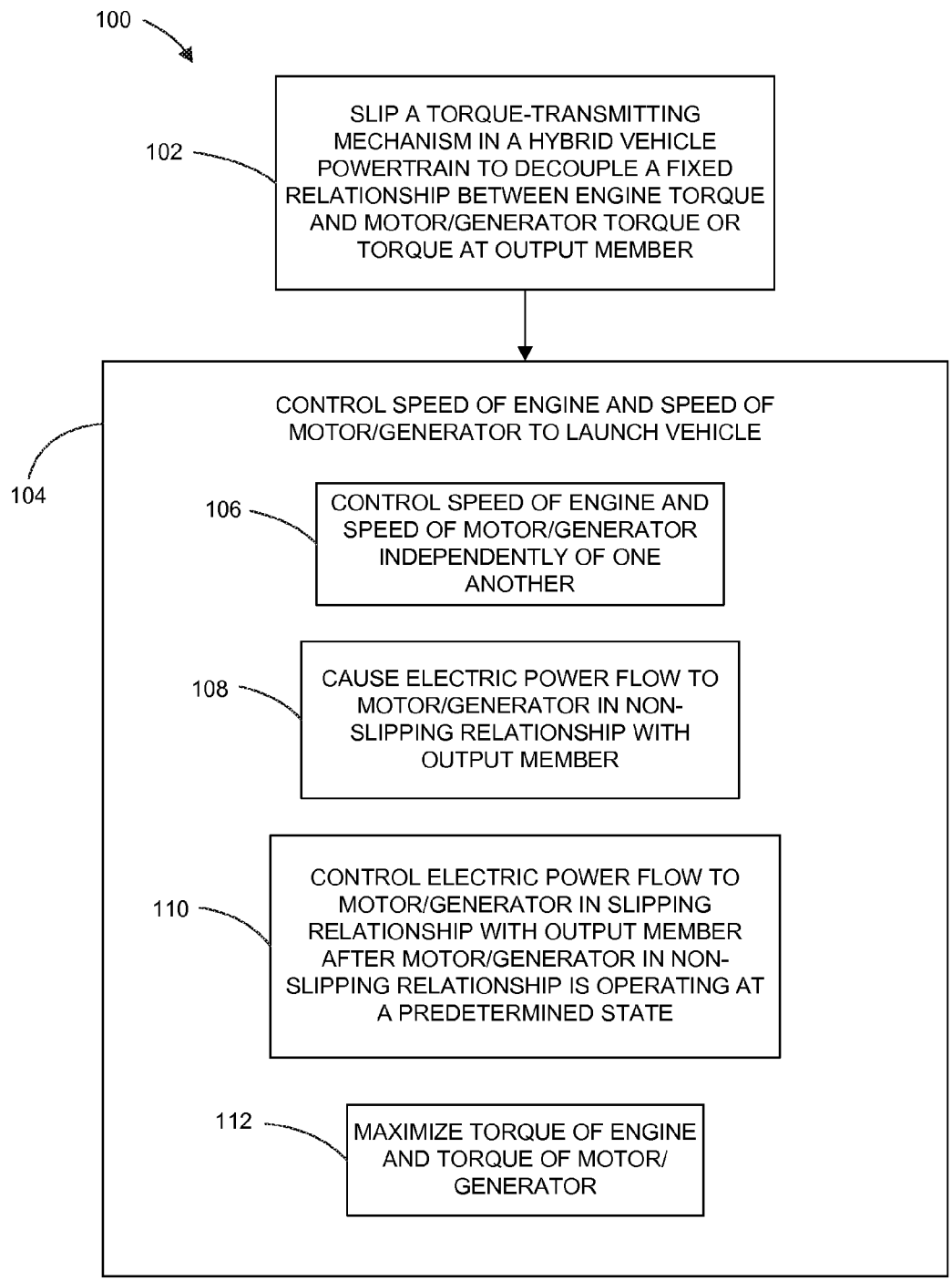
FIG. 3 is a flow chart of a method of operating a hybrid vehicle powertrain.

Under the method of controlling a powertrain 100 of FIG. 3, by utilizing the ECU 76 to control selected ones of the torque-transmitting mechanisms to "slip" under step 102, that is to only partially engage such that there is relative rotation between the components connected by the torque-transmitting mechanism, as is known to those skilled in the art, the torque relationship between the engine 14 and one or both of the motor/generators 56, 72 may be decoupled, so that speeds of each may be independently varied in substep 106 of step 104, controlling the speed of the engine and the speeds of the motor/generators to launch the vehicle, such that the torque added by the engine 14 and one or both of the motor/generators 56, 72 may be at any advantageous combination. Thus, the engine 14 and one or both of the motor/generators 56, 72 operate in parallel to add torque to the output member 64, the torque paths from the engine 14 and one or both of the motor/generators 56, 72 being separated via the slipping clutch. Additionally, if a clutch engageable between a differential gear set and the output member 64 is slipped, such as clutch 70, the speed of the output member 64 is decoupled from a fixed relationship to the motor/generators 56, 72 and engine 14 established by the differential gearing 24, 26, 28. Accordingly, by slipping one or more clutches, torque relationships may be optimized based on various factors such as total torque output capacity, load sharing among the torque-transmitting mechanisms, available battery power, etc.

Referring to FIG. 2, a first fixed speed ratio is established by engaging clutches 70, 71 and 75 in a non-slipping manner. In this fixed speed ratio, the torque provided by the engine 14 and by the motor/generators 56, 72 is in fixed relationship. By utilizing the ECU 76 to slip one or more of these clutches, a different relationship between engine torque, torque from one or more of the motor/generators and output torque is possible.

In one embodiment, clutch 75 may be slipped while clutches 70 and 71 may remain fully engaged. By slipping clutch 75, the fixed relationship between torque added by the engine 14 and the motor/generator 56 to torque added by the motor/generator 72 becomes a variable relationship, as the gear ratio through gear set 26 (which establishes the speed of shaft 66 and thus of motor/generator 72 in relation to the combined torque of engine 14 and motor/generator 56 flowing into the gear set 26) is varied by slipping clutch 75. Motor/generator 56 is in slipping relationship to the output member 64 while motor/generator 72 is in non-slipping relationship to the output member 64. Optionally, under substep 108, the ECU 76 may direct power from battery 74 initially to motor/generator 72, to the limit of its maximum torque capacity or the limit of available battery power (if this is less than that required to allow motor/generator 72 to operate at maximum torque capacity) and then, under substep 110, send battery power to motor/generator 56 after the torque contribution of motor/generator 72 is maximized. This would be desirable because motor/generator 72 in non-slipping relationship can provide torque to the output member 64 efficiently, which maximizes its torque contribution, while motor/generator 56 in slipping relationship to the output member 64 is in a fixed relationship with the engine 14, so it must be operated at a speed that is dependent on engine speed and not necessarily at a speed that will enable it to be operated for its maximum torque contribution. It is also more efficient to send power initially to motor/generator 72, as some of the power of motor/generator 56 is lost in the slipping clutch 75. As the speed of engine 14 increases, engine torque increases. Torque from the motor/generators 56, 72 eventually decreases at higher speeds, because of the power limit of the battery 74. There is some optimum speed between maximum engine torque (occurring at high speeds) and maximum motor/generator torque (occurring at some speed lower than the speed dictated by the differential gearing 24, 26 and 28 when the engine 14 is at a speed to provide its maximum torque) that provides the best combination of engine torque and motor/generator torque under substep 112. This optimum speed is realized by slipping clutch 75, and may not be attained when clutch 75 is not slipped and the speeds of the motor/generators 56, 72 are dependent upon the speed of the engine 14 due to the fixed gearing of gear sets 24, 26 and 28.

As an alternative to or in addition to slipping clutch 75, clutch 71 may be slipped, while clutch 75 is engaged, either non-slippingly or slippingly. Slipping clutch 71 while clutch 75 is fully engaged places the engine 14 in slipping relationship with output member 64 while both motor/generators 56, 72 are in non-slipping relationship to the output member 64. The speeds of the motor/generators 56, 72 are in a non-fixed relationship to the speed of the engine 14.

As an alternative or in addition to slipping either or both clutches 71 and 75, clutch 70 may be slipped. In this scenario, the speeds of both of the motor/generators 56, 72 (operating as motors) increase with increasing engine speed. As the speed of engine 14 increases, the torque provided by engine 14 increases, but torque provided by motor/generators 56, 72 eventually decreases because of the battery 74 power limit. By slipping clutch 70, the engine 14 may be operated at an optimum speed between the speed necessary for maximum engine torque and the speed where maximum motor torque is achieved, while still providing a speed at the output member 64 appropriate for launch conditions, due to decoupling of the rest of the transmission 11 from the output member 64.

After the vehicle is launched, the transmission may be operated in EVT mode by engaging clutches 70 and 71. The first fixed ratio may be established at about 7 MPH and then clutch 75 may be disengaged at about 40 MPH to return to EVT mode. The clutch 62 is then engaged at about 57 MPH.

With the clutches 62, 70 and 71 engaged, a second fixed ratio is achieved. All three gear sets 24, 26, 28 are active, and the ratio is 1.7:1, as indicated in the fixed ratio table of FIG. 2. The motors/generators 56, 72 may be turned off during the engagement of the clutches 62, 70 and 71 for fully mechanical operation. During the second fixed ratio, the motors 56, 72 may freewheel and no torque is present. The first mode ends when the clutch 70 is turned off and the clutches 62 and 71 remain engaged for the high-efficiency second mode of operation.

Should one wish to duplicate the results described herein, the outer gear members 30 and 38 in each of the first and second planetary gear sets 24 and 26 have 65 teeth, and the inner gear members 32 and 40 in each of the first and second planetary gear sets 24 and 26 have 33 teeth. The outer gear member 46 of the third planetary gear set 28 has 94 teeth, and the inner gear member 48 of the third planetary gear set 28 has 34 teeth. With the configuration of the transmission 11 heretofore described, and with the aforesaid number of teeth on the inner and outer gear members, the transmission provides a mechanical point while operating in the first mode. That is, the first motor/generator 56 has a zero rotational speed at about 50 MPH. To complete the description as to the operation of the motor/generators in the exemplary environment described, one must consider operation of the transmission in the second mode of operation.

III. Second Mode

The transition from the first to the second mode of operation is achieved by disengaging torque-transmitting mechanism 70 and continuing the application of torque-transmitting mechanisms 62 and 71. Similar to the previously described mode I overlap with fixed ratios, mode II overlaps fixed ratios in the truth table of FIG. 2, as determined by internal and engine speed limitations. At the inception of the second mode of operation, the first motor/generator 56 transitions from operating as a motor to operating as a generator, however this is influenced by the planetary gear ratio selections. The first motor/generator 56 continues to operate as a generator during operation of the transmission 10 in the second mode while the vehicle gains speed from about 70 MPH to about 88 MPH. At about 88 MPH the first motor/generator 56 transitions from operation as a generator back to operation as a motor as it transitions through a mechanical point wherein the motor/generator 56 has zero rotational speed. The first motor/generator 56 continues thereafter to operate as a motor.

At the beginning of the second mode of operation, the second motor/generator 72 continues to operate as a motor. In fact, the second motor/generator 72 operates as a motor until the vehicle reaches a speed of about 88 MPH, at which point it transitions to operation as a generator, and continues thereafter to operate as a generator.

With the configuration of the transmission 11 heretofore described, and with the aforesaid number of teeth on the inner and outer gear members, the transmission 11 provides two mechanical points while operating in the second mode. That is, the first motor/generator 56 has a zero rotational speed at about 88 MPH. In addition, if the engine continued to operate at maximum speed, the second motor/generator 72 would have a zero rotational speed at about 208 MPH. Hence, the transmission 11 provides two mechanical points in the second mode of operation.

As illustrated in the fixed ratio table of FIG. 2, third and fourth fixed ratios are available during the second mode. The third fixed ratio may be established with the simultaneous engagement of the clutches 62, 71 and 75, which locks all gear sets into a 1:1 ratio so that the output 64 rotates at the same speed as the input 12.

The fourth fixed ratio is established with the engagement of the clutches 62, 71 and 73 to provide a fixed overdrive ratio of 0.74:1, as illustrated in the fixed ratio table of FIG. 2. In the fourth fixed ratio, the first and second planetary gear sets 24 and 26 are active, and the motor/generator 56 may freewheel with no torque present, while motor/generator 72 is locked at zero speed relative to the transmission housing 68.

Accordingly, the transmission 11 of the invention provides three mechanical points and four available fixed ratios, thereby minimizing electrical losses in the motors/generators while providing maximum power quickly in the first mode via the lock-up clutch 75.

It should be understood that the exact location of the aforesaid mechanical points, in terms of output speed or vehicle speed, is determined not only by the number of teeth on the inner and outer gear members of the planetary gear sets, but also by the rotational speed of the input member 12. Hence, with the number of teeth disclosed for the inner and outer gear members in the exemplary embodiment, an increase in the speed of the input member 12 will shift the locations of the mechanical points to higher vehicular speeds, and conversely, a reduction in the speed of the input member 12 will shift the mechanical points to lower vehicular speeds.

IV. Alternate C4 Engagements

The C4 clutch 75 shown schematically between the planet carrier 44 and the sun gear 40 may also be located to connect the ring gear 38 and the sun gear 40, and will provide the same lockup function. The C3 brake, 73, however, must remain as shown to brake rotation of sleeve shaft 66.

The invention also contemplates that the lock-up clutch 75 could be positioned elsewhere on the planetary gear sets 24, 26. For example, the lock-up clutch may connect the sun gear 40 and ring gear 48 of the second planetary gear set 26. As a further alternative, the lock-up clutch may connect the carrier 36 and ring gear 30 of the first planetary gear set 24.

V. Reverse Mode

A reverse mode of operation is effected by having the ECU 76 operate the second motor/generator 72 as a motor, but reversing its rotational direction from the direction in which the second motor/generator 72 rotates when the vehicle begins to move forwardly from a stationary position in the first mode of operation.

While the best modes for carrying out the invention have been described in detail, those familiar with the art to which this invention relates will recognize various alternative designs and embodiments for practicing the invention within the scope of the appended claims.

The invention claimed is:

1. A method of operating a hybrid vehicle powertrain having an engine, an input member operatively connectable with the engine, a motor/generator, an electric power storage device for interchanging electrical power with said motor/generator, a differential gear set operatively connected between the input member and the output member and having a first, a second and a third member, power flow from the engine and the motor/generator respectively to said output member being through different members of said differential gear set such that the transmission is an electrically variable transmission, comprising:

slipping at least one torque-transmitting mechanism via a control unit operable to control engagement of said at least one torque-transmitting mechanism; wherein non-slipping engagement of said at least one torque-transmitting mechanism at least partially establishes a fixed speed ratio between said input member and said output member; wherein any other torque-transmitting mechanisms necessary to establish the fixed speed ratio are engaged; wherein said at least one torque-transmitting mechanism is selected from the group consisting of:
a torque-transmitting mechanism that connects the input member with the differential gear set;
a torque-transmitting mechanism that connects one of the members of the differential gear set with a stationary member where another of the members of the differential gear set is connected with the output member; and
a torque-transmitting mechanism that connects any two members of the differential gear set together for common rotation;
said slipping thereby decoupling a fixed relationship between engine torque and motor/generator torque or between engine torque and torque at said output member established by the differential gear set; and
controlling the speed of the engine and the speed of the motor/generator to launch the vehicle.

2. The method of claim 1, wherein said controlling is characterized by maximizing torque of the engine and by maximizing torque of the motor/generator given available electric power storage device power.

3. The method of claim 1, wherein said controlling is characterized by controlling the speed of the engine and the speed of the motor/generator independently of one another.

4. The method of claim 1, wherein the motor/generator is a first motor/generator and the hybrid vehicle powertrain has a second motor/generator; wherein the electric power storage device is operable for interchanging electrical power with the second motor/generator; wherein the control unit is operable for regulating electrical power interchange between the electric power storage device and the second motor/generator for causing selective torque generation by the second motor/generator; wherein said slipping places one of the motor/generators in slipping relationship with said output member; wherein the other of said motor/generators is in non-slipping relationship with said output member; wherein each of said motor/generators is characterized by a respective predetermined torque capacity; wherein said electric power storage device is characterized by a predetermined maximum power limit;
wherein said controlling includes causing electric power flow to said motor/generator in non-slipping relationship with the output member, and causing electric power flow to the motor/generator in slipping relationship with the output member only after the motor/generator in slipping relationship is operating at a predetermined state characterized by said predetermined torque capacity or said electric power storage device is providing power at said predetermined maximum power limit.

5. The method of claim 1, wherein said slipping is of two of said torque-transmitting mechanisms to thereby distribute a heat load generated during launch.

6. A method of operating a hybrid vehicle powertrain having an engine, an input member operatively connectable with the engine, a first and a second motor/generator, an electric power storage device for interchanging electrical power with said motor/generators, a differential gear set operatively connected between the input member and the output member and having a first, a second and a third member, power flow from the engine and one of the motor/generators respectively to said output member being through different members of said differential gear set such that the transmission is an electrically variable transmission:
slipping a torque-transmitting mechanism via a control unit operable to control engagement of the torque-transmitting mechanism, wherein the torque-transmitting mechanism connects any two members of the differential gear set together for common rotation; said slipping thereby decoupling a fixed relationship between engine torque and torque of the motor/generator connected with one of the members of the differential gear set as established by the differential gear set; and
controlling the speed of the engine and the speed of the motor/generator connected with one of the members of the differential gear set independently of one another to launch the vehicle.

7. The method of claim 6, wherein said slipping causes one of the motor/generators to be in slipping relationship with respect to the output member and the other of the motor/generators to be in non-slipping relationship with the output member; wherein said motor/generator in non-slipping relationship with the output member is characterized by a predetermined torque capacity; wherein said electric power storage device is characterized by a predetermined maximum power limit;
wherein said controlling includes causing electric power flow to said motor/generator in non-slipping relationship with the output member, and causing electric power flow to the motor/generator in slipping relationship with the output member only after the motor/generator in slipping relationship is operating at said predetermined torque capacity or said electric power storage device is providing power at said maximum power limit.

\* \* \* \* \*